United States Patent [19]

Tuurna et al.

[11] Patent Number: 5,826,530

[45] Date of Patent: Oct. 27, 1998

[54] WING SAIL

[75] Inventors: Sami Tuurna; Carl-Magnus Fogelholm, both of Espoo, Finland

[73] Assignee: OY Skywings AB, Espoo, Finland

[21] Appl. No.: 596,341

[22] PCT Filed: Aug. 19, 1994

[86] PCT No.: PCT/FI94/00361

§ 371 Date: Feb. 20, 1996

§ 102(e) Date: Feb. 20, 1996

[87] PCT Pub. No.: WO95/05973

PCT Pub. Date: Mar. 2, 1995

[30] Foreign Application Priority Data

Aug. 20, 1993 [FI] Finland .................................. 933666

[51] Int. Cl.⁶ ...................................................... B63H 9/06
[52] U.S. Cl. ........................................... 114/102; 114/103
[58] Field of Search ................................... 114/39.2, 102, 114/103, 43; 280/810

[56] References Cited

U.S. PATENT DOCUMENTS

| | | | |
|---|---|---|---|
| 2,329,220 | 9/1943 | Rummler | 114/102 |
| 3,487,800 | 1/1970 | Schweitzer | 114/39.2 |
| 4,269,133 | 5/1981 | Brown | 114/103 |
| 4,382,417 | 5/1983 | Talve | 114/102 |
| 4,651,665 | 3/1987 | Drake | 114/39.2 |

FOREIGN PATENT DOCUMENTS

| | | |
|---|---|---|
| 0015875 | 9/1980 | European Pat. Off. . |
| 0076954 | 4/1983 | European Pat. Off. . |
| 0823813 | 11/1982 | Finland . |
| 3222756 | 12/1983 | Germany . |
| 3500216 | 7/1986 | Germany . |
| 8600590 | 1/1986 | WIPO . |
| 8602330 | 4/1986 | WIPO . |
| 8703553 | 6/1987 | WIPO . |
| 9013477 | 11/1990 | WIPO . |

*Primary Examiner*—Sherman Basinger
*Attorney, Agent, or Firm*—Ladas & Parry

[57] ABSTRACT

A handheld wing sail comprises a sailcloth supported on frame members. The frame members comprise two mast tubes positioned in a V shape defining a nose angle and opposite respective tips. A boom is located between the mast tubes, the boom being curved at the symmetry plane of the wing sail and connected to each mast tube by each supporting tubes, each fastened to the boom at one end by a connection member and fastened at the opposite end to the respective mast tubes. A traverse tube joins the mast tubes together and is fastened to the mast tubes by connection pieces. The mast tubes and the boom are connected to each other by a nose link, which comprises a threadlike connection member made of flexible but substantially non-stretchable material for making it possible to change the nose angle and to fold the mast tubes toward the boom, whereby to bring the wing sail into a folded position for turning the mast tubes and the boom freely in different directions when the wing sail is in the folded position and, thus, ready for transport. The tips of the mast tubes are at tips of the sailcloth and have flexible antenna portions for keeping the wing sail taut during sailing.

17 Claims, 3 Drawing Sheets

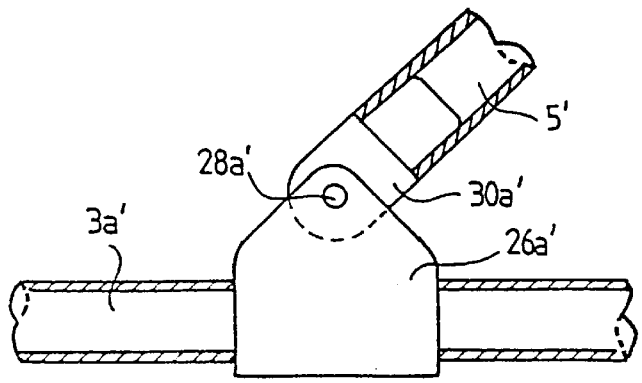
FIG. 5
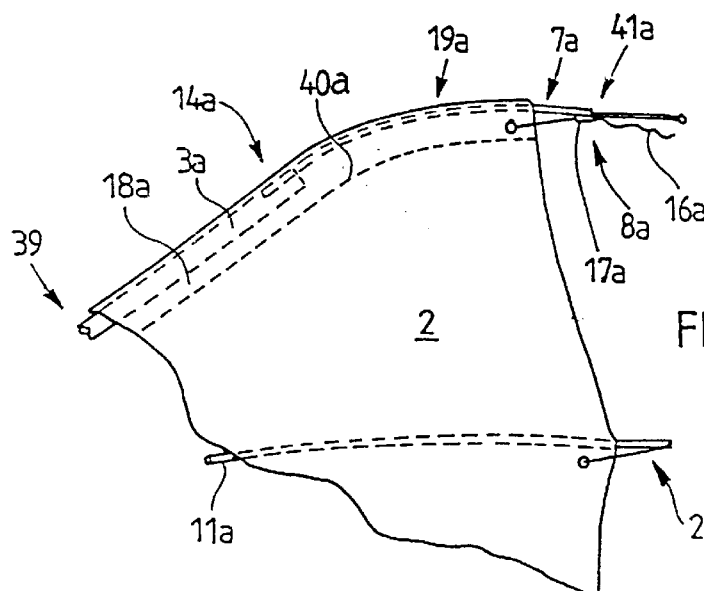
FIG. 6
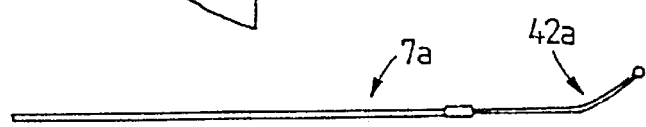
FIG. 7
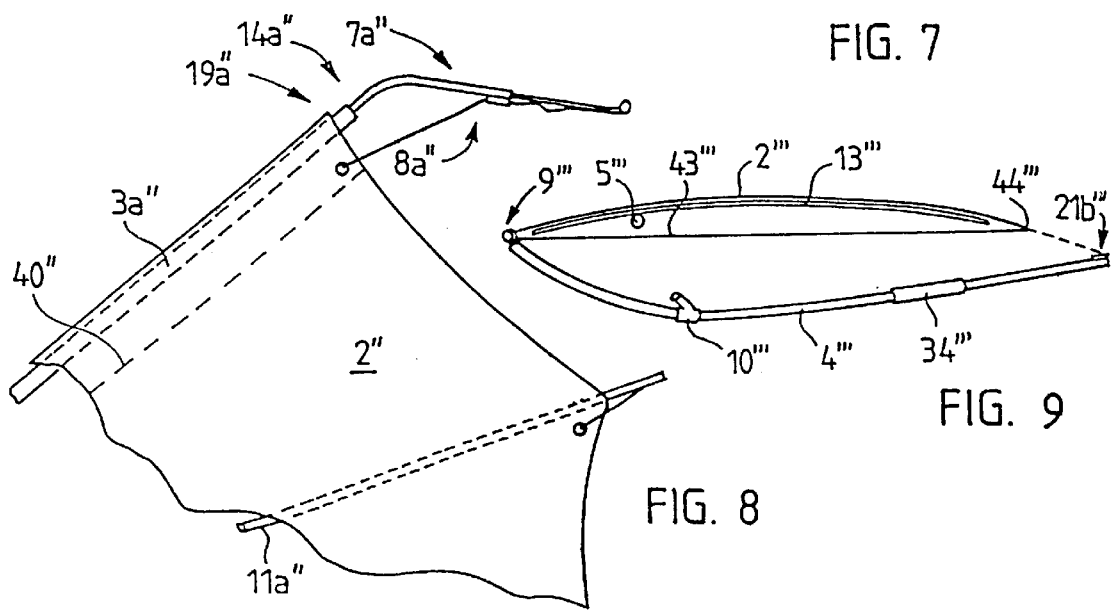
FIG. 8
FIG. 9

WING SAIL

BACKGROUND OF THE INVENTION

The invention relates to a wing sail to be held by hand and intended for sailing on snow or ice and in suitable terrain conditions. More precisely, the invention relates to a hand-held wing sail to be used preferably for sailing on ice and snow, which wing sail comprises a sailcloth or the like supported on frame portions, the frame portions comprising two mast tubes positioned in a V shape and defining a nose angle between themselves, a boom located in the area between the mast tubes and connected to each mast tube by means of supporting tubes, which are at one end fastened to the boom by means of a connection member and at the other end to the respective mast tubes by means of connection means, and a traverse tube joining the mast tubes together and fastened to the mast tubes by means of connection pieces.

The field of use of the wing sail according to the invention is preferably other than water. The sail is preferably used when moving on ice on skis or skates. Ice sailing by means of a wing sail and skis is a new demanding sport, making great technical demands on the wing sail. On hard ice, for instance, speeds of 50 to 90 km/h can be achieved. The wing sail must take a balanced driving position by itself and must not begin to sway in an uncontrolled manner, for instance. The sailer shall have an immediate and firm hold on the rig so that he "feels" its movements in his hands all the time and can coordinate the movements of the wing and his own movements according to the circumstances. This makes special demands on the structure and geometry of the rig.

An essential structural feature of known kite-like sailing rigs intended for sailboards and other light sailing equipments is a frame originally planned for sailing on water. Small rigs have been developed, in which wind power can be used in the same way as set forth in U.S. Pat. No. 3,487,800 relating to a sailboard rig, with the difference that kite rigs can be held also in the horizontal position during sailing. One objective of kite rig constructions has been to achieve a controlled flight of sailboards by means of a symmetric, relatively small rig utilizing wind buoyancy, and accordingly, by means of a small sail area.

From Patent Application WO 87/03553 of Thomas A. Magruder and German Offenlegungsschrift 3 222 756 A1 of Georg Hamann are known wing-like sail constructions, which are fastened to a sailboard by means of a mast. U.S. Pat. No. 4 382 417 of Harri Talve discloses a planar symmetric wing construction to be mounted to rest on the mast of the craft. From WO 90/13477 of Alan D. Ryon is known a symmetric rig construction also supported on the mast of the craft. A similar sailing equipment for sailing on snow or water skis is known from the Application WO 86/00590 of Robert N. Keller. All five last-mentioned wing sail solutions require that they are supported on the craft by a mast bearing their weight.

Symmetric sailing rigs to be held merely by hand are described for example in European Patent Application 82108870 of James R. Drake and Ulrich Stanciu, Published Application 0076954, and in Finnish Patent Application 0823813 of Roland Claude Le Bail. Each hand-held wing-like sail construction known from the above-mentioned publications allows the whole rig to sail soaring, having overcome its weight upon achieving a sufficient speed. The sailing rig disclosed in European Published Application 0076954 is suitable both for being mounted onto a mast and for being held merely by hand. Since the boom of the last-mentioned rig is straight and the supporting tubes are positioned in the rear in such a way that they are not suitable for being used as handles, sailing properties and balance are not very good. In addition, the rig is not easy to disassemble for transport. The sail construction according to Finnish Patent Application 823812 is not easy to disassemble for transport. The long supporting tubes of the sail construction make the structure heavy. Further, the tips of the sail construction are in use prone to breakage when they hit the ground, since they are stiff.

When sailing on ice or snow with above-mentioned known symmetric hand-adjustable kite rigs, which are inclineable to both sides of the horizontal plane, for instance with sail constructions disclosed in Finnish Patent Application 823813, problems arise from the fact that the rigs break easily when the wing tips thereof hit the ice, because ice conditions and high speeds strain the constructions, especially the wing tips.

On the one hand, wing sails operating on soaring principle shall be as aerodynamic as possible and therefore have narrow wing shapes, but on the other hand, they shall have sufficient sail areas, because otherwise they cannot be used in ordinary light wind conditions.

Generally, it can be said that known rigs comprise plenty of complicated frame members tending to increase their weight and to make the folding and transport difficult. The above holds true also for sailing rigs to be held merely by hand.

SUMMARY OF THE INVENTION

Said problems and objectives have been solved by means of a wing sail according to the invention, which is characterized in that the mast tubes and the boom are connected to each other by means of a nose link, which makes it possible to change the nose angle and to fold the mast tubes in the boom direction for bringing the wing sail into a folded position, and that the free ends of the mast tubes comprise at tips of the sailcloth flexible antenna portions, to which are connected tightening means for keeping the wing sail taut during sailing, and that the boom is curved in such a way that its maximum distance from the sailcloth is 25 to 50 cm at the symmetry plane of the wing sail and that the distance between the connection member and the nose link is 20 to 50% of the boom length. The distance between the connection means of the supporting tubes and the nose link is preferably 20 to 40% of the length of the mast tubes and the distance between the connection pieces and the nose link is 30 to 60% of the length of the mast tubes. The frame members support the whole sailcloth evenly, and the antenna portions mounted at the tips of the wing halves make an aerodynamically effective shape possible and prevent, due to their flexibility, the wing from being broken when the tip hits the ground. This facilitates the dismantling of the wing sail and improves the aerodynamic properties of the wing sail.

The whole frame of the wing sail according to the invention is implemented by means of a weight-saving, self-stretching geometry, and an assembly of the equipment ready for use is facilitated by means of a folding nose link connecting the wing halves and protecting, thanks to its structure, the wing sail also against breakage. When the handles are at a sufficient distance from the sail, the wing sail is balanced and easy to handle during driving. Preferred embodiments of the wing sail according to the invention are also set forth.

The greatest advantages of the wing sail according to the invention are that it is extremely light, has a simple and durable structure, is foldable, balanced and easy to manage, is safe and has good sailing properties also in light wind conditions.

BRIEF DESCRIPTION OF THE DRAWINGS

In the following, the wing sail according to the invention and its details are described through examples by means of the attached drawing, in which FIG. 5 shows one way of fastening a traverse tube and supporting tubes to a mast tube, FIG. 6 shows one embodiment of the tip of the wing sail of FIG. 2, in which embodiment an antenna portion is positioned inside a sailcloth, FIG. 7 shows the antenna portion and its damping piece, FIG. 8 shows another embodiment of the wing sail tip, in which embodiment the antenna portion is positioned outside the sailcloth and FIG. 9 shows one embodiment of the wing sail seen in the symmetry plane.

DESCRIPTION OF PREFERRED EMBODIMENTS

Figure 1:
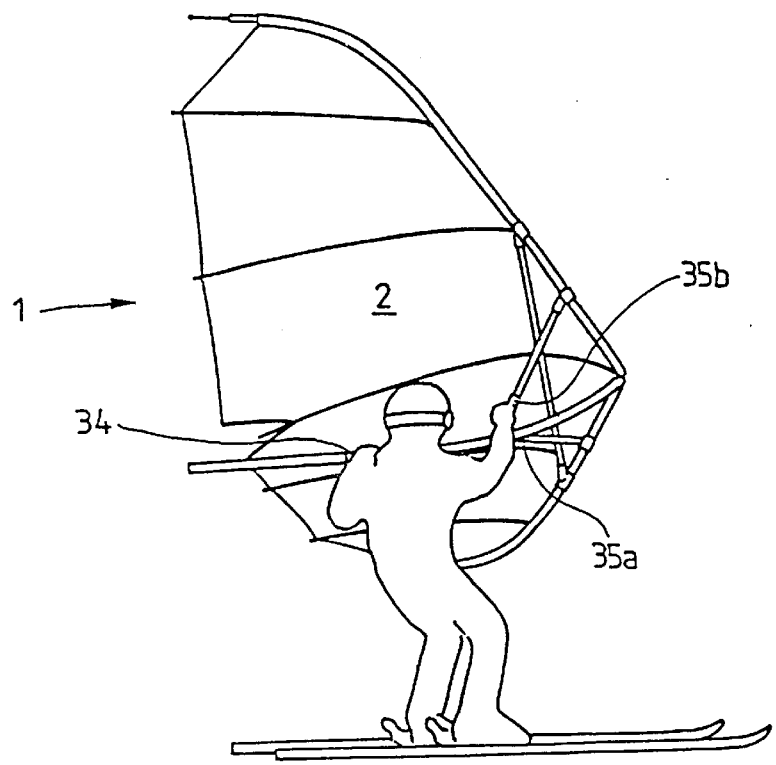
FIG. 1 illustrates a wing sail and its user on skis sailing on snowy ice.

In FIG. 1, a wing sail 1 according to the invention is in an operating position. From the Figure is seen that the wing sail is gripped with both hands. In addition, trapezes of different kinds can be used during sailing.

Figure 2:
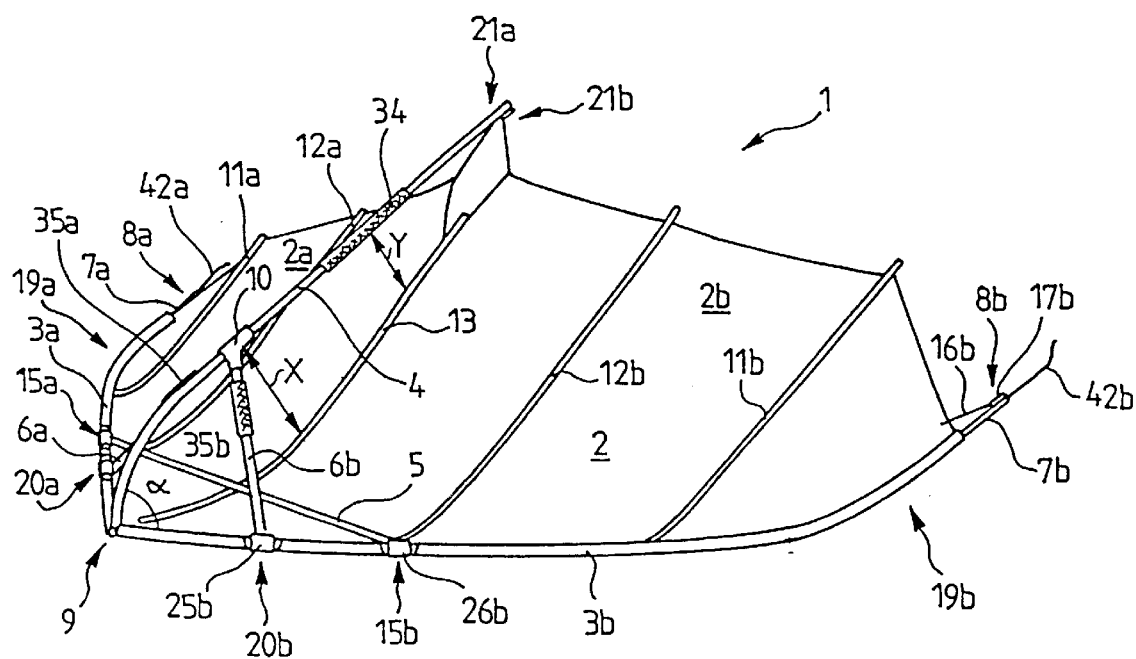
FIG. 2 illustrates one embodiment of the wing sail mounted on the ground on its back, i.e. seen from below.

FIG. 2 shows the wing sail of FIG. 1 from below. The wing sail comprises a sailcloth 2 or the like, mast tubes 3a and 3b, which are positioned in a V shape, situated in sailcloth pockets and define a nose angle α, a boom 4 located symmetrically between the mast tubes, a traverse tube 5, supporting tubes 6a and 6b, antenna portions 7a and 7b with their tightening means 8a, 8b, a nose link 9, a branch member 10 and sail battens 11a, 11b, 12a, 12b and 13. The boom 4 is curved in the area between the branch member 10 and the nose link 9 so that its maximum distance X from the sailcloth 2 is 25 to 50 cm at the symmetry plane. The branch member 10 is situated at the maximum distance or close to that. In the example of the figure, the distance between the branch member 10 and the nose link 9 is about 30% of the boom 4 length. The boom 4 is substantially straight from the branch member 10 backwards.

Figure 3:
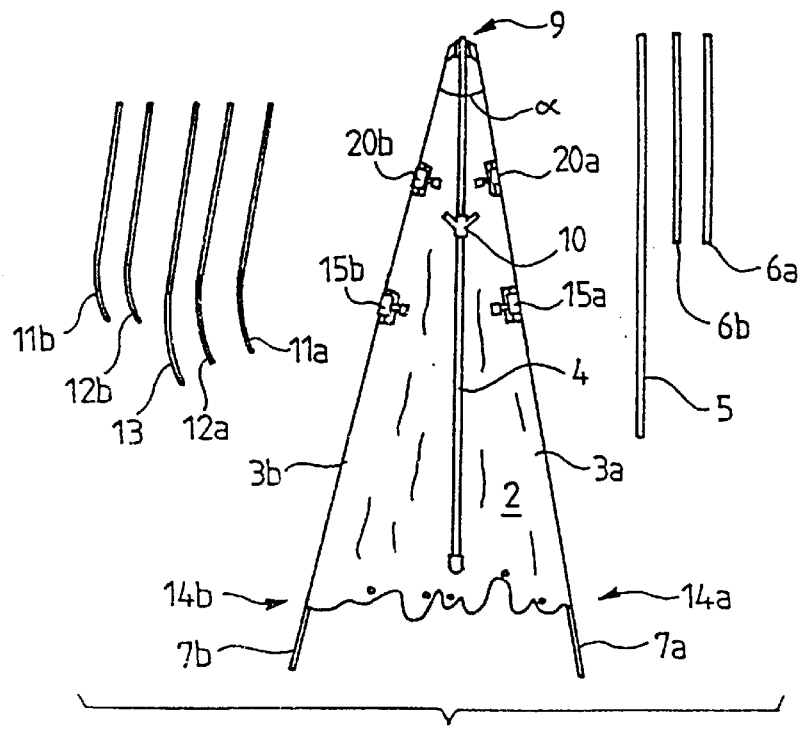
FIG. 3 shows the wing sail disassembled to a position ready for transport.

FIG. 3 shows the wing sail folded for transport. The mast tubes 3a and 3b are brought near the boom 4 and the sailcloth 2 is slackened. It is not necessary to detach the sailcloth 2 from the mast tubes 3a and 3b when the wing sail is mounted to a foldable position. The nose link 9 ties together the mast tubes 3a and 3b of the wing sail provided with the sailcloth 2 and the boom 4. The nose link 9 makes it possible to change the nose angle α and to fold the mast tubes 3a, 3b with respect to the boom 4, for mounting the wing sail into a sailing position and a folded position for transport, respectively. The supporting tubes 6a, 6b, the traverse tube 5 and the sail battens 11a, 11b, 12a, 12b and 13 of the wing sail are illustrated ready for transport beside the sailcloth 2. During transport, a preferred embodiment of the wing sail thus comprises nine separate structural parts.

From the components shown in FIG. 3, wing halves 2a, 2b of the wing sail 1 are initially opened for mounting the wing sail 1 into working order, by moving tips 14a, 14b of the mast tubes 3a and 3b farther away from each other. Subsequently, a traverse tube 5 is mounted between the mast tubes 3a and 3b. The traverse tube 5, fastened to connection pieces 15a and 15b at the mast tubes 3a, 3b, keeps the mast tubes and the wing halves 2a, 2b separate from each other. The distance between the connection pieces 15a, 15b and the nose link 9 is 30 to 60% of the length of the mast tubes 3a, 3b. Said area provides a firm and durable and, at the same time, light construction and makes a good aerodynamics possible. In case of FIG. 2, the distance is about 50%. By utilizing the tightening means 8a and 8b (see FIGS. 2 and 6) at the tips of the antenna portions 7a and 7b, the sailcloth 2 is pulled taut. Then the antenna portions 7a and 7b are stretched to form a bow, because they are made of a flexible material. During stretching, the traverse tube 5 is also locked to the connection pieces 15a, 15b. The tightening means 8a, 8b comprise a string 16a, 16b and a stay tightener 17a, 17b, consisting for instance of a tapering link, to which the string is stretched. Since the antenna portions 7a, 7b are mounted within pockets 18a of the sailcloth, tips 19a, 19b of the sailcloth 2 are provided with a curved shape. While the rear end of the boom 4 is lifted slightly upwards from the remaining sail construction, ends of the supporting tubes 6a and 6b are mounted in place to their own connection means 20a and 20b. The distance between the connection means 20a, 20b and the nose link 9 is 20 to 40% of the length of the mast tube 3a, 3b and the distance between the branch member 10 and the nose link 9 is 20 to 50% of the boom 4 length. Said areas provide a firm and light construction and a capability of self-stretching and an easy-sailed wing sail, whereby places for the hands (handles 35a and 35b) are situated symmetrically on both sides of the aerodynamic midpoint. In case of FIG. 2, said distances are about 30%. The branch member 10 situated on the front half of the boom 4 is meant for receiving the opposite ends of the supporting tubes 6a and 6b. The branch member 10 enclosing the boom 4 like a sleeve comprises two Y-shaped portions 10a, 10b, which are formed integrally fastened to each other, see FIG. 4. The connection described is rigid and maintains the rigidity of the construction. The supporting tubes 6a, 6b lock the mast tubes 3a, 3b rigidly to the boom 4 and maintain the shape of the wing sail 2.

The final shape of the wing sail is provided after the mounting of the sail battens 11a, 11b, 12a, 12b and 13 by stretching the sailcloth 2 at tensioning means 21a and 21b situated at the rear end of the boom 4 towards the rear portion of the boom 4. Then the ends of the supporting tubes 6a, 6b are also locked to the connection means 20a, 20b and the branch member 10. The sail batten 13 and the boom 4 define the symmetry plane of the wing sail. From FIG. 2 is seen that the traverse tube 5 is situated between the sail batten 13 and the boom 4 in such a way that the sail batten 13 exposes the midpoint of the traverse tube 5 to a force. All sail battens 11a, 11b, 12a, 12b and 13 comprise tensioning means, cf. FIG. 6, from which is seen that the sail batten 11a, for instance, comprises tensioning means 22a.

From the above is understood that the wing sail 1 constitutes a self-stretching, shape permanent, light kite rig suitably self-adjusting during sailing, in which rig the wing halves 2a, 2b form a slight V angle when the wing sail is looked at straight from the front. The nose angle α is then preferably 120° to 140°. If the nose angle α exceeds 140°, the sailability of the wing sail suffers essentially. The construction is symmetric with respect to the symmetry plane of the wing sail. In FIG. 1, the boom 4 and the midmost sail batten 13 are situated in the symmetry plane. Thanks to the capability of self-stretching, the supporting tubes 6a, 6b and the traverse tube 5 do not require separate locking means. Instead, the firmer said tubes are locked to the mast tubes and the boom, the firmer the tension is at the tightening means 8a, 8b of the antenna portions and at the tensioning means 21a, 21b in the rear of the boom 4.

Figure 4:
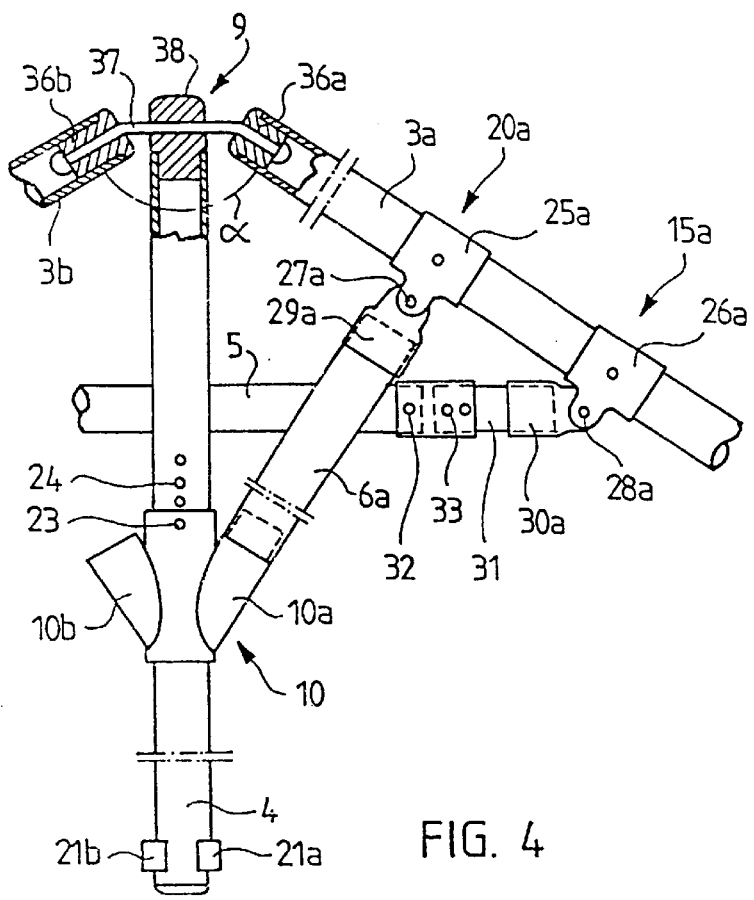
FIG. 4 shows frame members of the wing sail and associated parts.

As appears from FIG. 4, the branch member 10 is displaceable in the longitudinal direction of the boom 4. By means of tenon and mortise joint means 23, 24, the branch member can be locked to a desired place of the boom 4.

The connection means 20a, 20b and the connection pieces 15a, 15b comprise a sleeve portion 25a, 26a (25b and 26b are seen from FIG. 2) enclosing the mast tubes 3a, 3b, to which sleeve portion are arranged by means of a bolted joint 27a, 28a receiving pieces 29a, 30a for receiving the supporting tubes 6a, 6b and the traverse tube 5, respectively.

The traverse tube 5 includes an adjuster sleeve 31, which comprises a tenon and mortise joint 32, 33 for adjusting the length of the traverse tube and the nose angle α between the mast tubes 3a, 3b. The adjuster sleeve 31 can be locked to different points of the traverse tube 5 by means of the tenon and mortise joint 32, 33. Since the traverse tube 5 comprises said adjusting/locking means, it is recommendable that the supporting tubes 3a, 3b also comprise adjusting/locking means for adjusting their length. The adjusting means of the supporting tubes 3a, 3b can be of tenon and mortise joint type.

To facilitate sailing, the front part of the wing sail 2 preferably comprises a transparent area in the range of the traverse tube 5.

In FIGS. 1 and 2, reference numerals 34, 35a, 35b indicate handles to hold on during sailing. The handle 34 is situated in the middle or rear part of the boom and the handles 35a, 35b are situated at the boom 4 end of the supporting tubes 6a, 6b. The handle 34 and, subject to on which side of the wing sail 1 the sailer is, either the handle 35a or 35b are held simultaneously. The distance Y between the handle 34 and the sailcloth 2 is 15 to 25 cm, preferably 17 to 20 cm. The sailer can meet the wind even at an angle of 40°, all angles exceeding said angle being possible during sailing. A tack is changed by rising on the skis straight towards the wind, while the wing sail is lifted above the head and flies exactly in the horizontal plane, and by falling on the skis to the other tack, whereby the wing sail is lowered down to the normal oblique position again. At a tack change, the hand holding the handle of a supporting tube is moved to hold the boom handle, and the hand holding the boom handle is moved to hold the handle of the other supporting tube.

The structure of the nose link 9 appears from FIG. 4 in more detail. The nose link 9 comprises plugs 36a and 36b mounted inside the mast tubes 3a and 3b, through which plugs is inserted a flexible threadlike material 37, which is substantially inextensible in the longitudinal direction and joins the mast tubes 3a and 3b together. The threadlike material 37 is locked to the plugs 36a, 36b by means of a knot, for instance. The boom 4 is suspended from the threadlike material 37 by providing a sleeve 38 at the nose of the boom with a hole in the transverse direction. The threadlike material 37 makes it possible to turn the mast tubes 3a, 3b and the boom 4 freely with respect to each other. The connection manner described makes it possible to join the mast tubes 3a and 3b and the boom 4 as well as the sail-cloth 2 to a tight bundle for transport without detaching the sail-cloth from the mast tubes 3a, 3b. The portions 3a and 3b as well as 4 may be moved with respect to each other when the construction is free and without tension. The thread material 37 of the nose link 9 is stretched taut and keeps the wing sail 1 together when stretched ready for sailing. The described threadlike nose link 9 is very light, firm and solid and, in addition to that, easy to provide.

FIG. 5 shows one way of fixing a traverse tube 5' to a mast tube 3a'. A connection piece 26a' encloses the mast tube 3a' and the connection piece comprises a tenon part 30a', on which the end of the traverse tube 5' is pushed. Reference numeral 28a' indicates the location of a link, which comprises a fixing screw. Connection means for fixing the supporting tubes may preferably be according to FIG. 5.

FIG. 6 shows the tip of a wing sail, in which the antenna portion 7a is detachably fixed to the ends 14a of the mast tubes 3a, 3b in such a way that the antenna portion is situated inside a sail pocket 18a at a front edge 39 of the sailcloth 2. Reference numeral 40a indicates a curved seam. When the sailcloth 2 is stretched by the tightening means 8a situated at the tip part of the antenna portion 7a, the sailcloth 2 is stretched into its shape. Then the antenna portion 7a forms together with the sailcloth 2 a curved shape along a portion between the tip 14a of the mast tube 3a and the tip 41a of the antenna portion 7a attached thereto. This curvature keeps its shape during sailing by means of the tension caused by the tightening means 8a. When the tension is loosened, the antenna portion 7a will be straight due to its flexibility, as appears from the FIGS. 3 and 7.

The antenna portions 7a and 7b may be made of different elastic materials and be profiles having cross-sections of different shapes. The cross-section is preferably such that the antenna portion yields in a predetermined bending direction, but is substantially rigid in another bending direction perpendicular with respect to the first-mentioned direction. The shape of the cross-section may preferably be essentially flat; a semicircle or a rectangle. Such properties are provided by means of a flat profile material. The antenna portions 7a, 7b may be fixed detachably to the mast tubes 3a, 3b in various positions. This makes it possible to change the antenna portions as well as to change the angle of attack between the tip 19a of the sailcloth 2 and the wind for finding an optimal sail geometry.

The wing sail according to the invention, provided with a standard sailcloth of 4.3 square meters, weighs only 5 to 6 kg, the frame members of the rig being made of a firm aluminium alloy and/or glass fibre tube. Lightness is of primary importance for a self-supported wing sail.

FIG. 7 shows the antenna portion 7a in a state without tension, whereby it is straight. The end of the antenna portion is provided with a flexible damping piece 42a, which yields, when loaded, by bending easier than the antenna portion 7a. The damping piece 42a serving as a buffer efficiently prevents the tip of the wing sail from being broken, in case the tip meets an obstacle. At the same time, the damping piece 42a makes the use of the wing sail safe.

FIG. 8 shows an alternative wing sail tip 19a". A sailcloth 2" is fixed to a mast tube 3a" in such a way that an antenna portion 7a" remains outside the sailcloth. The sailcloth 2" is at its tip tied to the antenna portion 7a" (like in Figure) or alternatively to a tip 14a" of the mast tube 3a. Different sail cuttings are made possible in this way. The antenna portions 7a" and 7b" described in this embodiment can also be detached and mounted at the tip 14a" of the mast tube 3a" in different positions and at different angles.

FIG. 9 illustrates an embodiment of the wing sail, comprising a lower sailcloth 43'''. The lower sailcloth 43''' is arranged in the area between a sailcloth 2''' and a boom 4''' and extends between the mast tubes and is stretched straight up to a rear edge 44''' of the sailcloth. Such a wing sail is somewhat quicker than the solution in which there is no lower sailcloth 43''', because the induced resistance of the wing is smaller.

The use of the described wing sail is not restricted to winter sailing only, but it may also be used on roller skis and skates, for instance. The invention and its embodiments are not limited to the embodiments set forth in the specification and drawings, but the details of the invention may be implemented in many ways within the scope of the attached claims. Accordingly, it is not necessary that the branch member is displaceable in the boom direction and the length of the traverse tube and supporting tubes can be adjusted. Differing from the above, length adjustment—if there is one—may be implemented by using telescope tubes. Instead of a branch member, a connection member of another type may be used.

We claim:

1. A handheld wing sail comprising:
a sailcloth (2) supported on frame members (3a, 3b, 4, 5, 6a, 6b, 7a, 7b), the frame members comprising two mast tubes (3a and 3b) positioned in a V shape defining a nose angle ($\alpha$) and opposite respective tips (14a), a boom (4) located in the area between the mast tubes, the boom being curved at the symmetry plane of the wing sail and connected to each mast tube (3a and 3b) by supporting tubes (6a, 6b), which are at one end fastened to the boom (4) by a connection member (10) and at the opposite end to the respective mast tubes (3a and 3b) by connection means (20a, 20b), and a traverse tube (5) joining the mast tubes (3a, 3b) together and fastened to the mast tubes by connection pieces (15a, 15b), wherein the mast tubes (3a, 3b) and the boom (4) are connected to each other by a nose link (9), which comprises a threadlike connection member (37), which is made of flexible but substantially non-stretchable material for making it possible to change the nose angel ($\alpha$) and to fold the mast tubes (3a, 3b) toward the boom (4), whereby to bring the wing sail into a folded position for turning the mast tubes (3a, 3b) and the boom (4) freely in different directions when the wing sail is in the folded position and, thus, ready for transport, the tips (14a) of the mast tubes (3a, 3b) have, at tips (19a, 19b) of the sailcloth (2), flexible antenna portions (7a, 7b) to which are connected tightening means (8a, 8b) for keeping the wing sail taut during sailing, the boom (4) is curved in such a way that its maximum distance (X) from the sailcloth (2) is 25 to 50 cm at the symmetry plane of the wing sail, and the distance between the connection member (10) and the nose link (9) is 20 to 50% of the boom (4) length.

2. A wing sail according to claim 1, wherein the distance between the connection means (20a, 20b) and the nose link (9) is 20 to 40% of the length of the mast tubes (3a, 3b) and that the distance between the connection pieces (15a, 15b) and the nose link (9) is 30 to 60% of the length of the mast tubes (3a, 3b).

3. A wing sail according to claim 1, wherein the sailcloth (2) is fastened to the antenna portions (7a, 7b) to provide the tips (19a, 19b) of the sailcloth (2) with a curved shape.

4. A wing sail according to claim 3, wherein the antenna portions (7a, 7b) are fastened to the tips (14a) of the mast tubes (3a, 3b) in such a way that they are situated inside the sailcloth (2).

5. A wing sail according to claim 1, wherein the antenna portions (7a, 7b) are fastened to the tips (14a) of the mast tubes (3a, 3b) in such a way that they are situated inside the sailcloth (2).

6. A wing sail according to claim 5, wherein the antenna portions (7a, 7b) are fastened detachably to the tips (14a) of the mast tubes (3a, 3b).

7. A wing sail according to claim 1, wherein the antenna portions (7a, 7b) are manufactured of a profile material that yields in a predetermined bending direction, but is substantially rigid in another bending direction.

8. A wing sail according to claim 1, wherein the free ends of the antenna portions (7a, 7b) are provided with a flexible damping piece (42a, 42b) for lifting up the tips (19a, 19b) of the sailcloth (2) when the tips of the sailcloth meet an obstacle.

9. A wing sail according to claim 1, comprising sail battens (11a, 11b, 12a, 12b and 13), one (13) of which is situated at least approximately in the symmetry plane of the wing sail, wherein the traverse tube (5) is situated between the sail batten (13) situated at least approximately in the symmetry plane of the wing sail (2) and the boom (4) in such a way that the sail batten exposes the transverse tube (5) to a force.

10. A wing sail according to claim 1, wherein the connection member consists of a branch member (10), which is made of a stiff material, encloses the boom (4) and comprises two Y-shaped pieces (10a and 10b) connecting the supporting tubes (6a, 6b) rigidly to each other.

11. A wing sail according to claim 10, wherein the branch member (10) is displaceable in the longitudinal direction of the boom (4) and lockable to at least two places of the boom by means of locking means (23, 24).

12. A wing sail according to claim 11, wherein the locking means are of tenon and mortise joint (23, 24) type.

13. A wing sail according to claim 1, wherein the connection means (20a, 20b) and the connection members (15a, 15b) comprise a sleeve portion (25a, 25b, 26a, 26b) enclosing the mast tubes (3a, 3b), to which sleeve portion, by means of a bolted joint (27a, 28a), receiving pieces (29a, 30a) are arranged for receiving the supporting tubes (6a, 6b) and the traverse tube (5), respectively.

14. A wing sail according to claim 1, wherein the traverse tube (5) comprises adjusting means (31 to 33) for adjusting its length and the nose angle ($\alpha$) between the mast tubes (3a, 3b).

15. A wing sail according to claim 14, wherein the adjusting means consist of an adjuster sleeve (31) arranged in the traverse tube and lockable to different places of the traverse tube by means of a tenon and mortise joint (32, 33).

16. A wing sail according to claim 14, wherein the supporting tubes (6a, 6b) comprise adjusting means for adjusting their length.

17. A wing sail according to claim 1, and further comprising a lower sailcloth (43''') in an area between the sailcloth (2''') and the boom (4''').

* * * * *